US012293867B2

(12) United States Patent
Jung et al.

(10) Patent No.: US 12,293,867 B2
(45) **Date of Patent: *May 6, 2025**

(54) COIL COMPONENT

(71) Applicant: SAMSUNG ELECTRO-MECHANICS CO., LTD., Suwon-si (KR)

(72) Inventors: Ji Hyung Jung, Suwon-si (KR); Byeong Cheol Moon, Suwon-si (KR); Joung Gul Ryu, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/369,314

(22) Filed: Sep. 18, 2023

(65) Prior Publication Data

US 2024/0006118 A1 Jan. 4, 2024

Related U.S. Application Data

(63) Continuation of application No. 16/673,113, filed on Nov. 4, 2019, now Pat. No. 12,046,413.

(30) Foreign Application Priority Data

Jul. 5, 2019 (KR) ........................ 10-2019-0081383

(51) Int. Cl.
*H01F 27/32* (2006.01)
*H01F 17/00* (2006.01)
(Continued)

(52) U.S. Cl.
CPC ........... *H01F 27/327* (2013.01); *H01F 17/02* (2013.01); *H01F 27/2804* (2013.01);
(Continued)

(58) Field of Classification Search
CPC .... H01F 27/327; H01F 17/02; H01F 27/2804; H01F 27/292; H01F 27/324; H01F 17/0006
(Continued)

(56) References Cited

U.S. PATENT DOCUMENTS

| | | | |
|---|---|---|---|
| 9,595,384 | B2 | 3/2017 | Nakamura et al. |
| 10,515,748 | B2 | 12/2019 | Yoshioka et al. |

(Continued)

FOREIGN PATENT DOCUMENTS

| | | | |
|---|---|---|---|
| CN | 107452463 | A | 12/2017 |
| CN | 106664069 | B | 8/2020 |

(Continued)

OTHER PUBLICATIONS

Office Action dated Apr. 11, 2024 issued in the related Chinese Patent Application No. 201911393429.0.

(Continued)

*Primary Examiner* — Shawki S Ismail
*Assistant Examiner* — Joselito S. Baisa
(74) *Attorney, Agent, or Firm* — Morgan, Lewis & Bockius LLP

(57) ABSTRACT

A coil component includes a nonmagnetic body having a cured product of a polymer resin, an insulating substrate embedded in the body and having a thickness of 30 μm or less, a coil portion including first and second coil patterns respectively disposed on first and second opposing surfaces of the insulating substrate, and first and second external electrodes disposed on a surface of the body to be connected to each of the first and second coil patterns exposed to the surface of the body.

25 Claims, 15 Drawing Sheets

(51) Int. Cl.
*H01F 17/02* (2006.01)
*H01F 27/28* (2006.01)
*H01F 27/29* (2006.01)

(52) U.S. Cl.
CPC ....... *H01F 27/2847* (2013.01); *H01F 27/292* (2013.01); *H01F 27/324* (2013.01); *H01F 17/0006* (2013.01)

(58) Field of Classification Search
USPC .................................................. 336/177, 200
See application file for complete search history.

(56) References Cited

U.S. PATENT DOCUMENTS

| | | | |
|---|---|---|---|
| 10,930,425 | B2 | 2/2021 | Kim |
| 11,024,455 | B2 | 6/2021 | Sekiguchi et al. |
| 11,694,838 | B2 * | 7/2023 | Kim .................... H01F 17/0013 336/192 |
| 11,875,929 | B2 * | 1/2024 | Takatsu ................. H01F 41/127 |
| 12,132,015 | B2 * | 10/2024 | Lambert ............... H01F 41/127 |
| 2005/0167639 | A1 | 8/2005 | Hoshio et al. |
| 2005/0195062 | A1 | 9/2005 | Yoshida et al. |
| 2007/0181965 | A1 | 8/2007 | Ohmi et al. |
| 2013/0113593 | A1 | 5/2013 | Jeong et al. |
| 2014/0009254 | A1 | 1/2014 | Ohkubo et al. |
| 2014/0145812 | A1 * | 5/2014 | Lee ....................... H01F 41/041 336/200 |
| 2015/0035634 | A1 | 2/2015 | Nakamura et al. |
| 2015/0102891 | A1 | 4/2015 | Yoon et al. |
| 2015/0287515 | A1 | 10/2015 | Choi |
| 2016/0189840 | A1 | 6/2016 | Ahn et al. |
| 2016/0322154 | A1 | 11/2016 | Park |
| 2017/0148562 | A1 | 5/2017 | Lee et al. |
| 2017/0154720 | A1 * | 6/2017 | Ohkubo .................. H01F 17/04 |
| 2017/0178789 | A1 | 6/2017 | Kim et al. |
| 2017/0178790 | A1 | 6/2017 | Kim et al. |
| 2017/0194089 | A1 | 7/2017 | Jang et al. |
| 2017/0345558 | A1 | 11/2017 | Sekiguchi et al. |
| 2018/0090258 | A1 | 3/2018 | Ju et al. |
| 2018/0268987 | A1 | 9/2018 | Yoon et al. |
| 2019/0013148 | A1 * | 1/2019 | Ohkubo ................ H01F 17/045 |
| 2019/0051446 | A1 | 2/2019 | Park et al. |
| 2019/0122811 | A1 | 4/2019 | Jung et al. |
| 2019/0215962 | A1 | 7/2019 | Fukahori et al. |
| 2020/0143979 | A1 | 5/2020 | Ohkubo et al. |
| 2021/0022254 | A1 | 1/2021 | Nogushi et al. |
| 2024/0128018 | A1 * | 4/2024 | Yanagida ............ H01F 27/2828 |

FOREIGN PATENT DOCUMENTS

| | | | |
|---|---|---|---|
| JP | 5-234811 | A | 9/1993 |
| JP | 11-204335 | A | 7/1999 |
| JP | 2000124031 | A | 4/2000 |
| JP | 2001-335689 | A | 12/2001 |
| JP | 2004-221572 | A | 8/2004 |
| JP | 2004296574 | A | 10/2004 |
| JP | 2006-310716 | A | 11/2006 |
| JP | 2007-067214 | A | 3/2007 |
| JP | 2008-066594 | A | 3/2008 |
| JP | 2008-195782 | A | 8/2008 |
| JP | 4216917 | B2 | 1/2009 |
| JP | 4235042 | B2 | 3/2009 |
| JP | 2011096197 | A | 5/2011 |
| JP | 2015-079958 | A | 4/2015 |
| JP | 2016-009862 | A | 1/2016 |
| JP | 2019-508906 | A | 3/2019 |
| KR | 10-2013-0049875 | A | 5/2013 |
| KR | 10-2015-0044372 | A | 4/2015 |
| KR | 10-2015-0106352 | A | 9/2015 |
| KR | 10-2017-0079183 | A | 7/2017 |
| KR | 10-1762027 | B1 | 7/2017 |
| KR | 10-1792388 | B1 | 10/2017 |
| KR | 10-2018-0033883 | A | 4/2018 |
| WO | 2011/148787 | A1 | 12/2011 |
| WO | 2019/107289 | A1 | 6/2019 |

OTHER PUBLICATIONS

Office Action dated Nov. 21, 2023 issued in the related Chinese Patent Application No. 201911393429.0 with English translation.

Korean Office Action dated May 21, 2020 issued in Korean Patent Application No. 10-2019-0081383 (with English 'anslation).

Korean Office Action dated Feb. 14, 2022, issued in corresponding Korean Patent Application No. 10-2020-0144873 {with English translation).

Japanese Office Action dated Jun. 20, 2023, issued in corresponding Japanese Patent Application No. 2019-196245.

Office Action dated Jan. 5, 2024 issued in parent Application, U.S. Appl. No. 16/673,113.

Office Action issued on Oct. 17, 2023 in the related Japanese Patent Application No. 2019-196245 with English translation.

* cited by examiner

COIL COMPONENT

CROSS-REFERENCE TO RELATED APPLICATION(S)

This application is the continuation application of U.S. patent application Ser. No. 16/673,113 filed on Nov. 4, 2019, which claims benefit of priority to Korean Patent Application No. 10-2019-0081383 filed on Jul. 5, 2019 in the Korean Intellectual Property Office, the disclosure of which is incorporated herein by reference in its entirety.

BACKGROUND

1. Field

The present disclosure relates to a coil component.

2. Description of Related Art

An inductor is a coil component and is a representative passive electronic component used in electronic devices, together with resistors and capacitors.

A high frequency (HF) inductor is a kind of coil component that is used in a high frequency band of 100 MHz or more, and is used for noise reduction of a signal terminal or impedance matching.

Such a HF inductor is typically formed by stacking a plurality of dielectric ceramic green sheets in which a conductor paste is printed in a coil shape and sintering the stack. In this case, each turn of the coil is formed in a three-dimensional helix formed in a stacking direction of the green sheet, which may be disadvantageous in efforts to thin the component.

SUMMARY

An aspect of the present disclosure is to provide a coil component for high frequency capable of having a low-profile.

Another aspect of the present disclosure is to provide a coil component with improved component characteristics in a high frequency band.

According to an aspect of the present disclosure, a coil component includes a nonmagnetic body having a cured product of a polymer resin, an insulating substrate embedded in the body and having a thickness of 30 μm or less, a coil portion including first and second coil patterns respectively disposed on first and second opposing surfaces of the insulating substrate, and first and second external electrodes disposed on a surface of the body to be respectively connected to the first and second coil patterns exposed to the surface of the body.

According to another aspect of the present disclosure, a coil component includes an insulating substrate having a thickness of 30 μm or less, a coil portion including a planar spiral coil pattern having a plurality turns disposed on at least one surface of the insulating substrate, and a body including nonmagnetic powder and a polymer resin, the body having the insulating substrate and the coil portion embedded therein and having a thickness of 0.65 mm or less. The body is in contact with the coil planar spiral pattern and fills spaces between adjacent turns of the plurality of turns of the planar spiral coil pattern.

According to a further aspect of the present disclosure, a coil component includes a support substrate having a through-hole extending therethrough, a coil portion including a spiral shaped coil pattern disposed on at least one surface of the support member to extend around the through-hole, and a nonmagnetic body having the support substrate and coil portion embedded therein, extending through the through-hole of the support substrate, and extending between adjacent windings of the spiral shaped coil pattern.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
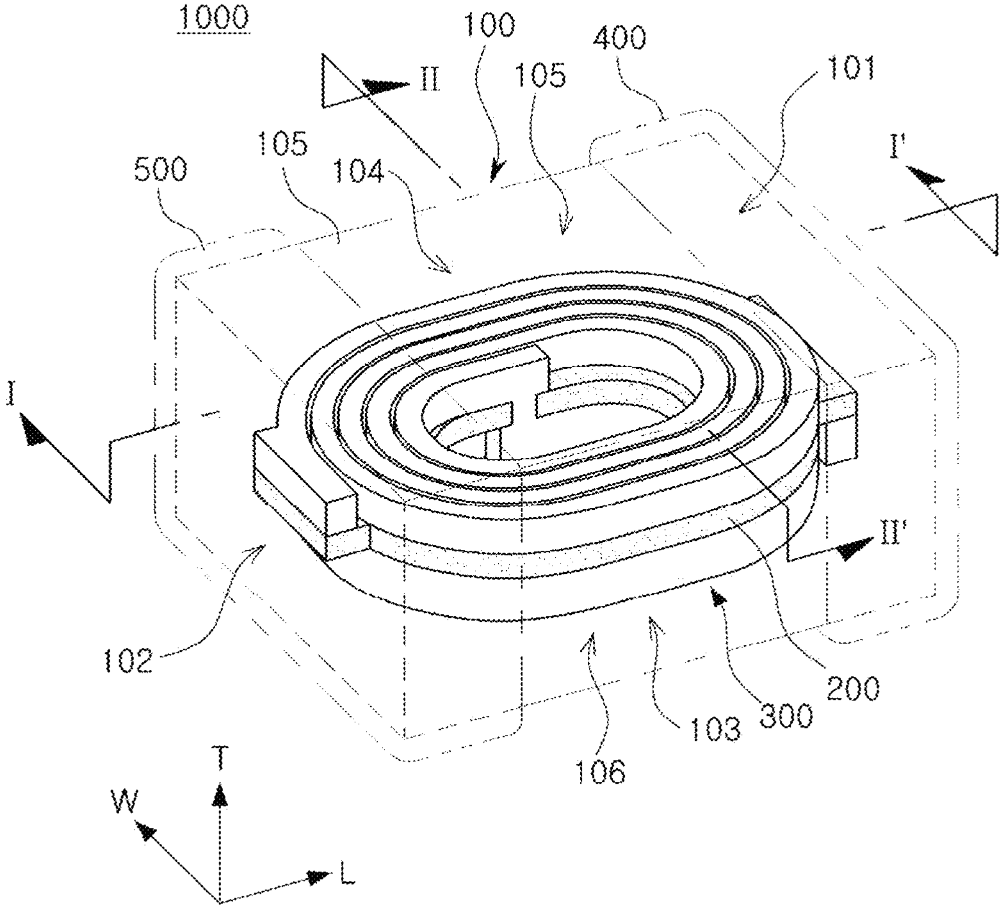
FIG. 1 is a schematic view of a coil component according to a first embodiment of the present disclosure.

Hereinafter, embodiments of the present disclosure will be described as follows with reference to the attached drawings. The terms used in the example embodiments are used to simply describe an example embodiment, and are not intended to limit the present disclosure. A singular term includes a plural form unless otherwise indicated. The terms, "include," "comprise," "is configured to," etc. of the description are used to indicate the presence of features, numbers, steps, operations, elements, parts or combination thereof, and do not exclude the possibilities of combination or addition of one or more other features, numbers, steps, operations, elements, parts or combination thereof. Also, the term "disposed on," "positioned on," and the like, may indicate that an element is positioned below an object, and does not necessarily mean that the element is positioned on the object with reference to a gravity direction.

The term "coupled to," "combined to," and the like, may not only indicate that elements are directly and physically in contact with each other, but also include configurations in which one or more other elements are interposed between the elements such that the elements are also in contact with the other elements.

Sizes and thicknesses of elements illustrated in the drawings are indicated as examples for ease of description, and example embodiments in the present disclosure are not limited thereto.

In the drawings, an L direction is a first direction or a length direction, a W direction is a second direction and a width direction, and a T direction is a third direction or a thickness direction.

In the descriptions and the accompanied drawings, the same elements or elements corresponding to each other will be described using the same reference numerals, and overlapped descriptions will not be repeated.

In electronic devices, various types of electronic components may be used, and various types of coil components may be used between the electronic components to remove noise, or for other purposes. In other words, in electronic devices, a coil component may be used as a power inductor, a high frequency inductor, a general bead, a high frequency bead, a common mode filter, and the like.

Meanwhile, hereinafter, it will be described that the coil component according to an embodiment of the present disclosure is a high frequency inductor used in a high frequency band (100 MHz or more), but the scope of the present disclosure is not limited thereto.

First Embodiment and Modified Example

Figure 2:
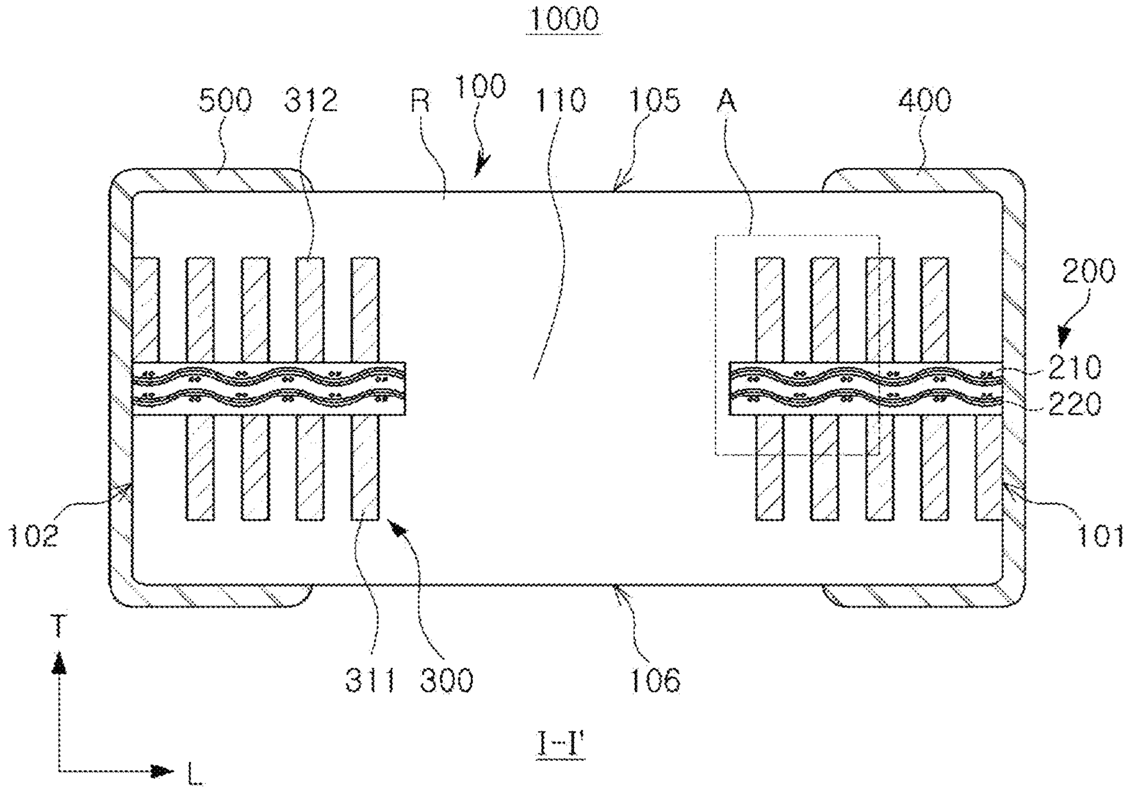
FIG. 2 is a cross-sectional view taken along line I-I' of FIG. 1.
Figure 3:
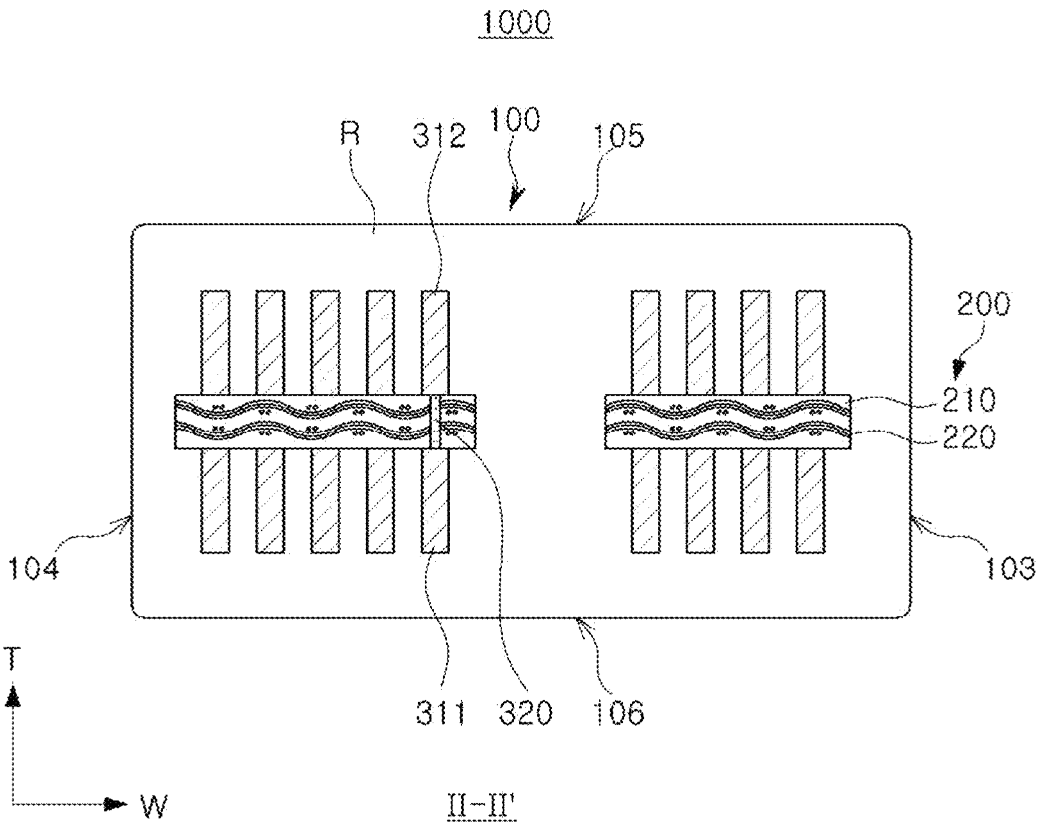
FIG. 3 is a cross-sectional view taken along line II-IF of FIG. 1.
Figure 4:
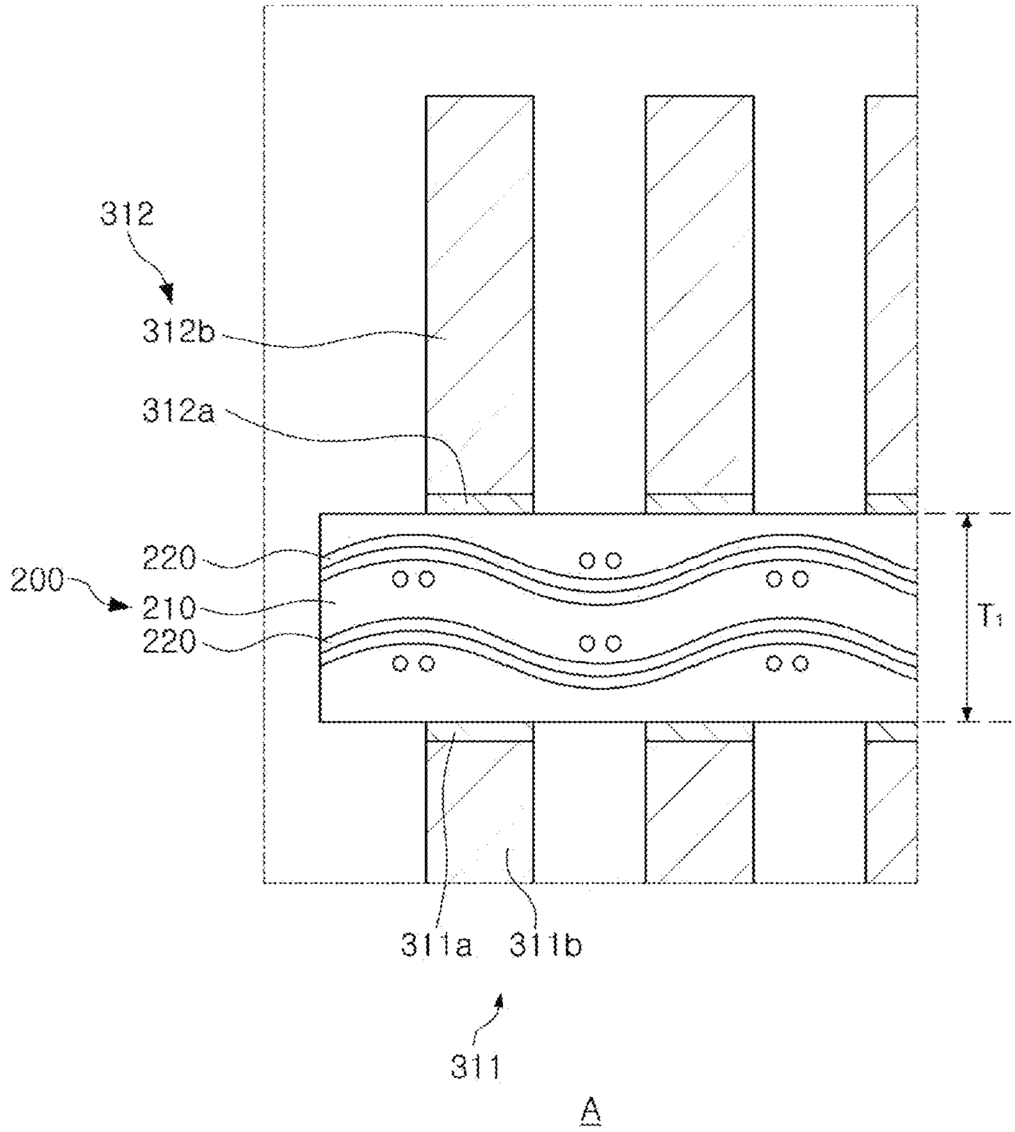
FIG. 4 is an enlarged view of portion A of FIG. 2.
Figure 5:
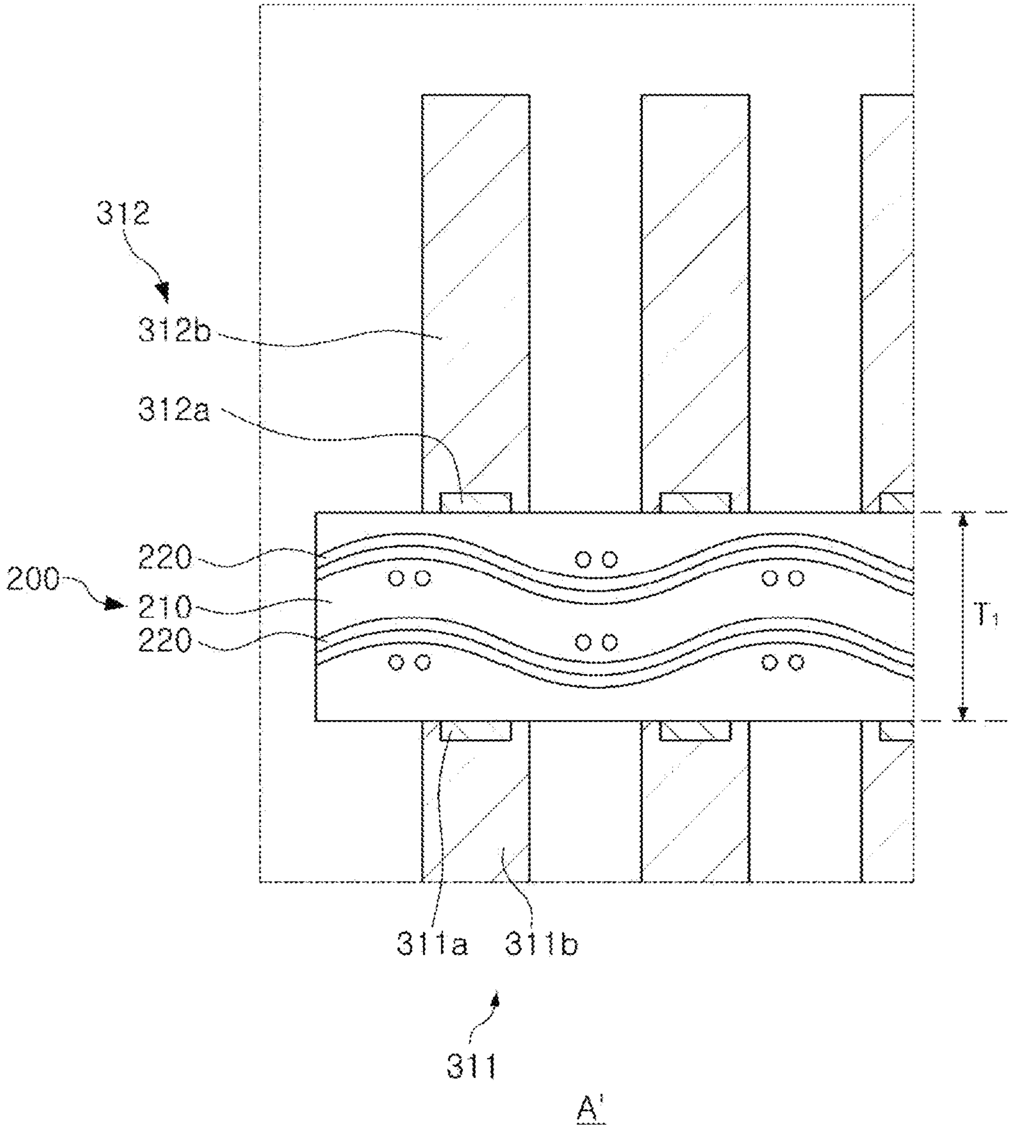
FIG. 5 is an enlarged view of a portion A of a modified example coil component.
Figure 6:
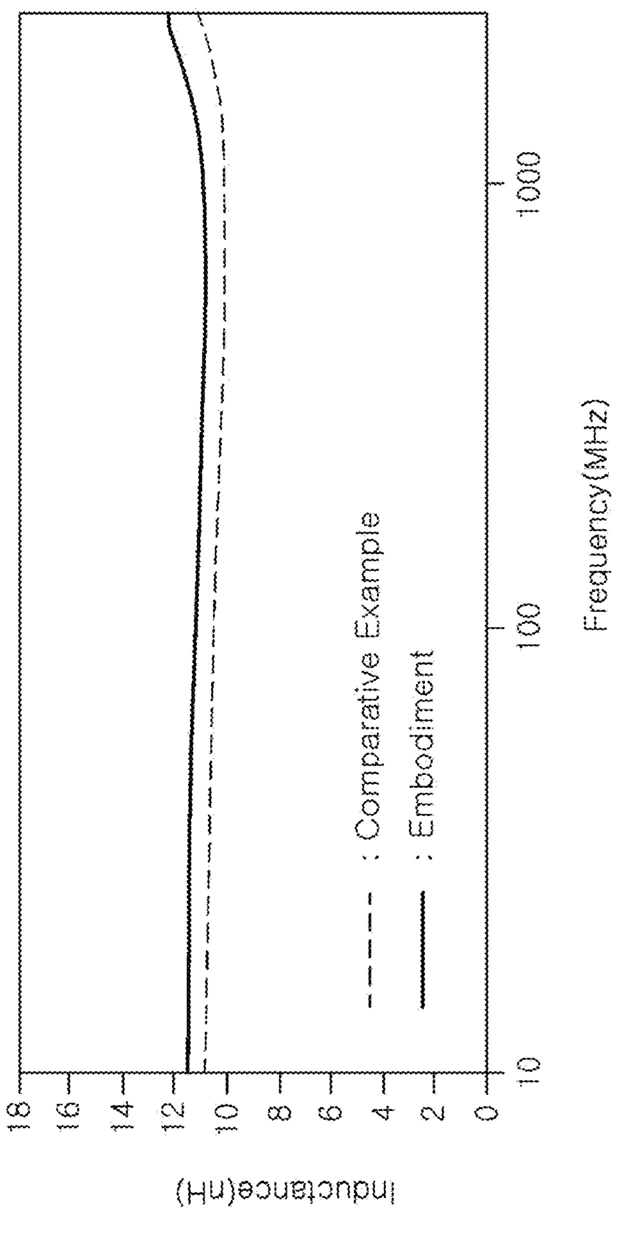
FIG. 6 is a plot illustrating variations in inductance according to an operating frequency of the coil component according to the first embodiment of the present disclosure in comparison with a comparative example.

FIG. 1 is a schematic view of a coil component according to a first embodiment of the present disclosure. FIG. 2 is a cross-sectional view taken along line I-I' of FIG. 1, FIG. 3 is a cross-sectional view taken along line II-IF of FIG. 1. FIG. 4 is an enlarged view of portion A of FIG. 2. FIG. 5 is an enlarged view of a modified example of portion A of FIG. 2. FIG. 6 is a plot illustrating variations in inductance according to an operating frequency of the coil component according to a first embodiment of the present disclosure in comparison with a comparative example.

Referring to FIGS. 1 to 5, a coil component 1000 according to a first embodiment of the present disclosure includes a body 100, an insulating substrate 200, a coil portion 300, and external electrodes 400 and 500.

The body 100 forms an exterior of the coil component 1000 according to the present embodiment, and the body 100 embeds the insulating substrate 200 and the coil portion 300 therein.

The body 100 may have a substantially hexahedral shape as a whole.

Based on FIGS. 1 to 3, the body 100 may include a first surface 101 and a second surface 102, opposing each other in a length direction L, a third surface 103 and a fourth surface 104, opposing each other in a width direction W, and a fifth surface 105 and a sixth surface 106, opposing each other in a thickness direction T. Each of the first to fourth surfaces 101, 102, 103, and 104 of the body 100 may correspond to a wall surface of the body 100 connecting the fifth surface 105 and the sixth surface 106 of the body 100. Hereinafter, both end surfaces of the body 100 will refer to the first surface 101 and the second surface 102 of the body 100, both side surfaces of the body 100 will refer to the third surface 103 and the fourth surface 104 of the body 100, one surface of the body 100 will refer to the sixth surface 106 of the body, and the other surface of the body 100 will refer to the fifth surface 105 of the body. In addition, hereinafter, the fifth surface 105 and the sixth surface 106 of the body 100 may be referred to as upper and lower surfaces of the body 100, respectively, with reference to the directions of FIGS. 1 to 3.

The body 100 may be formed such that the coil component 1000, in which the external electrodes 400 and 500 to be described later are formed, has a length of 2.0 mm, a width of 1.2 mm, and a thickness of 0.65 mm, but is not limited thereto. Alternately, the body 100 may be formed such that the coil component 1000 according to the present embodiment in which the external electrodes 400 and 500 are formed, has a length of 2.0 mm, a width of 1.6 mm, and a thickness of 0.55 mm. Alternately, the body 100 may be formed such that the coil component 1000 according to the present embodiment in which the external electrodes 400 and 500 are formed, has a length of 2.0 mm, a width of 1.2 mm, and a thickness of 0.55 mm. Alternately, the body 100 may be formed such that the coil component 1000 according to the present embodiment in which the external electrodes 400 and 500 are formed, has a length of 1.2 mm, a width of 1.0 mm, and a thickness of 0.55 mm. However, since the size of the coil component 1000 according to the present embodiment as described above is merely an example, it is not excluded from the scope of the present disclosure that the coil component 1000 may be formed to have a size less than or equal to the size described above.

The body 100 may be formed of a nonmagnetic material, such as a material including a cured product R of a polymer resin. As an example, in the present embodiment, the body 100 may be formed by stacking at least one or more insulating sheets including a thermosetting polymer resin, a curing agent, a curing accelerator, and the like formed of a nonmagnetic material on both surfaces of the insulating substrate 200 on which the coil portion 300 to be described later is formed, and then thermosetting the stacked insulating sheets. In the present specification, the nonmagnetic material may refer to a material having relative magnetic permeability close to 1 (e.g., a relative magnetic permeability of 1.5 or less, a relative magnetic permeability of 1.05 or less, or the like) and hardly affected by an external magnetic field. Therefore, the nonmagnetic in this specification may include a paramagnetic material and a diamagnetic material.

The cured product R of the polymer resin may be formed by thermosetting a thermosetting polymer resin, one of an epoxy, a polyimide, a liquid crystal polymer, or the like, alone or in combination thereof, but a material of the cured product is not limited thereto.

The body 100 includes a core 110 penetrating the coil portion 300 to be described later. The core 110 may be formed by filling at least a portion of composite sheets in a through hole of the coil portion 300, in a process of stacking and curing the composite sheets, but is not limited thereto.

The insulating substrate 200 is embedded in the body 100. The insulating substrate 200 is configured to support the coil portion 300 to be described later.

The insulating layer 200 may be formed of an insulating material including a thermosetting insulating resin such as an epoxy resin, a thermoplastic insulating resin such as a polyimide, or a photosensitive insulating resin, or may be formed of an insulating material in which a reinforcing material such as a glass fiber or an inorganic filler is impregnated with such an insulating resin. For example, the insulating layer 200 may be formed of an insulating material such as prepreg, Ajinomoto build-up film (ABF), FR-4, a bismaleimide triazine (BT) resin, a photoimageable dielectric (PID) film, and the like, but is not limited thereto.

As an inorganic filler, at least one or more materials selected from a group consisting of silica ($SiO_2$), alumina ($Al_2O_3$), silicon carbide (SiC), barium sulfate ($BaSO_4$), talc, mud, a mica powder, aluminium hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the insulating layer 200 is formed of an insulating material including a reinforcing material, the insulating layer 200 may provide improved stiffness. When the insulating layer 200 is formed of an insulating material which does not include a glass fiber, the insulating layer 200 may be advantageous in reducing an overall thickness of the coil portion 300. When the insulating layer 200 is formed of an insulating material including a photosensitive insulating resin, the number of processes for forming the coil portion 300 may be reduced such that manufacturing costs may be reduced, and a fine via may be formed.

In the present embodiment, the insulating substrate 200 includes an insulating resin 210 and a glass cloth 220 impregnated in the insulating resin 210. As an example without limitation, the insulating substrate 200 may be formed by using a copper clad laminate CCL. The glass cloth 220 may mean that a plurality of glass fibers are woven.

The glass cloth may be formed of a plurality of layers. When the glass cloth is formed of a plurality of layers, rigidity of the insulating substrate 200 may be further improved. In addition, even if the insulating substrate 200 is damaged in a process of removing portions of first conductive layers 311*a* and 312*a* to be described later, a shape of the insulating substrate 200 may be maintained to reduce a defect rate.

A thickness T1 of the insulating substrate 200 may be 10 μm or more and 30 μm or less. When the thickness T1 of the insulating substrate 200 is less than 10 μm, it may be difficult to secure sufficient rigidity in the insulating substrate 200, and thus it may be difficult to support the coil portion 300 to be described later in a manufacturing process. When the thickness T1 of the insulating substrate 200 exceeds 30 μm, it may be disadvantageous to thinning the coil component, and in the body 100 having the same volume, a volume occupied by the insulating substrate 200 may increase and the volume that can be occupied by the coil portion 300 may be reduced.

The coil portion 300 includes planar spiral coil patterns 311 and 312 disposed on the insulating substrate 200, and is embedded in the body 100 to exhibit characteristics of the coil component. For example, when the coil component 1000 of the present embodiment is utilized as a high frequency (HF) inductor, used in the high frequency band (100 MHz or more), the coil portion 300 may serve to remove noise of a signal terminal or matching impedance.

The coil portion 300 includes first and second coil patterns 311 and 312, and a via 320. Specifically, based on directions of FIG. 1, FIG. 2, and FIG. 3, a first coil pattern 311 is disposed on a lower surface of the insulating substrate 200, and a second coil pattern 312 is disposed on an upper surface of the insulating substrate 200. The via 320 penetrates through the insulating substrate 200 and is in contact with and connects the first coil pattern 311 and the second coil pattern 312 to each other. In this way, the coil portion 300 may function as one coil in which one or more turns are formed around the core 110 as a whole.

The first and second coil patterns 311 and 312 each have a planar spiral shape in which a plurality of turns are formed around the core 110 as a central axis thereof. As an example, the first coil pattern 311 may be wound around the core 110 as a central axis on a lower surface of the insulating substrate 200 based on the direction of FIG. 2, and may have a plurality of turns in contact with the lower surface of the insulating substrate 200. The first coil pattern 312 may be wound around the core 110 as a central axis on an upper surface of the insulating substrate 200 based on the direction of FIG. 2, and may have a plurality of turns in contact with the upper surface of the insulating substrate 200.

End portions of the first and second coil patterns 311 and 312 are connected to first and second external electrodes 400 and 500 to be described later. That is, the end portion of the first coil pattern 311 is connected to the first external electrode 400, and the end portion of the second coil pattern 312 is connected to the second external electrode 500.

As an example, the end portion of the first coil pattern 311 may be exposed to the first surface 101 of the body 100, and end portion of the second coil pattern 312 may be exposed to the second surface 102 of the body 100. Each end portion may thus be connected to be in contact with a respective one of the first and second external electrodes 400 and 500 disposed on the first and second surfaces 101 and 102 of the body.

Each of the first and second coil patterns 311 and 312 includes first conductive layers 311*a* and 312*a* formed in contact with the insulating substrate 200 and second conductive layers 311*b* and 312*b* disposed in the first and second conductive layers 311*a* and 312*a*. The first coil pattern 311 includes the first conductive layer 311*a* formed in contact with the lower surface of the insulating substrate 200 and the second conductive layer 311*b* disposed to cover the first conductive layer 311*a*, based on directions of FIGS. 4 and 5. The second coil pattern 312 includes the first conductive layer 312*a* formed in contact with the upper surface of the insulating substrate 200 and the second conductive layer 312*b* disposed to cover the first conductive layer 312*a*, based on directions of FIGS. 4 and 5.

The first conductive layers 311*a* and 312*a* may be seed layers for forming the second conductive layers 311*b* and 312*b* by electroplating. The first conductive layers 311*a* and 312*a*, serving as the seed layers of the second conductive layers 311*b* and 312*b*, may be formed to be thinner than the second conductive layers 311*b* and 312*b*. The first conductive layers 311*a* and 312*a* may be formed by a thin film process such as sputtering or the like, or an electroless plating process. When the first conductive layers 311*a* and 312*a* are formed by the thin film process such as sputtering or the like, at least a portion of a material constituting the first conductive layers 311*a* and 312*a* may have a shape penetrating into the insulating substrate 200. It can be confirmed that a difference occurs in concentrations of a metal material constituting the first conductive layers 311*a* and 312*a* in a thickness direction T of the body 100.

Thicknesses of the first conductive layers 311*a* and 312*a* may be 0.5 μm or more and 3 μm or less. When the thicknesses of the first conductive layers 311*a* and 312*a* are less than 0.5 μm, it may be difficult to implement the first conductive layers 311*a* and 312*a*. When the thicknesses of the first conductive layers 311*a* and 312*a* exceed 3 μm, at least portions of the first conductive layers 311*a* and 312*a* may remain even after the first conductive layers 311*a* and 312*a* is removed by etching from regions other than (or except for) a region in which the second conductive layers 311*b* and 312*b* are to be formed by plating. Additionally or alternatively, when the thicknesses of the first conductive layers 311*a* and 312*a* exceed 3 μm, removal of the first conductive layers 311*a* and 312*a* from regions other than a region in which the second conductive layers 311*b* and 312*b* are to be formed may necessitate excessive etching which may result in the second conductive layers 311*b* and 312*b* themselves also being etched and removed.

Referring to FIG. 4, the second conductive layers 311*b* and 312*b* expose at least a portion of side surfaces of the first conductive layers 311*a* and 312*a*. In the present embodiment, a seed layer (a configuration that becomes a first conductive layer in a subsequent process) is formed on both opposing upper and lower surfaces of the insulating substrate 200, a plating resist for forming the second conductive layers 311*b* and 312*b* on the seed layer is formed on the seed layer, the second conductive layers 311*b* and 312*b* are formed by electroplating, and after the plating resist is removed, portions of the seed layer on which the second conductive layers 311*b* and 312*b* are not formed are selectively removed. Therefore, at least portions of the side surfaces of the first conductive layers 311*a* and 312*a* formed by selectively removing the seed layer are exposed without being covered by the second conductive layers 311*b* and 312*b*. The seed layer may be formed by performing electroless plating or sputtering on the insulating substrate 200. Alternately, the seed layer may be a copper foil of a copper clad laminate (CCL). The plating resist may be formed by applying a plating resist forming material to the seed layer and then performing a photolithography process. After the photolithography process, an opening may be formed in a region of the plating resist in which the second conductive layers 311*b* and 312*b* are to be formed. Selective removal of the seed layer may be performed by a laser process or an etching process. When the seed layer is selectively removed by etching, the first conductive layers 311*a* and 312*a* may have side surfaces having a cross-sectional area that increases toward the insulating substrate 200.

Referring to FIG. 5, the second conductive layers 311*b* and 312*b* cover the first conductive layers 311*a* and 312*a* and are in contact with the insulating substrate 200. In the present modified example, unlike the case of FIG. 4, the first conductive layers 311*a* and 312*a* having a spiral shape are formed on both surfaces of the insulating substrate 200, respectively, and the second conductive layers 311*b* and 312*b* are formed on the first conductive layers 311*a* and 312*a* by electroplating. When the second conductive layers 311*b* and 312*b* are formed by anisotropic plating, a plating resist may not be used, but is not limited thereto. When the second conductive layers 311*b* and 312*b* are formed by isotropic plating, a plating resist for forming the second conductive layer may be used. An opening for exposing the first conductive layers 311*a* and 312*a* is formed in the plating resist for forming the second conductive layers. A diameter of the opening is formed to be larger than line widths of the first conductive layers 311*a* and 312*a*, and as a result, the second conductive layers 311*b* and 312*b* filling the opening cover the first conductive layers 311*a* and 312*a* and come into contact with the insulating substrate 200.

Meanwhile, in the present embodiment, as described above, the coil component 1000 is formed by first forming the coil portion 300 on the insulating substrate 200, and then laminating and curing the insulating sheet on the insulating substrate 200. Therefore, the present embodiment is distinguished from a technique in which an insulating layer that serves as a body is first formed on the insulating substrate, the insulating layer is patterned into a coil-shaped form having an opening portion, and then the coil portion is formed in the opening portion of the coil-shaped form with plating by a conductive material. In a latter case, a seed layer for electroplating is formed along an inner surface (inner wall and bottom) of the opening portion of the coil-shaped opening. Meanwhile, due to the difference in the method described above, in the present embodiment, in comparison with the latter case, the first conductive layers 311*a* and 312*a* of each turn are not formed on the side surfaces of the second conductive layers 311*b* and 312*b*. That is, in the present embodiment compared with the latter case, the side surfaces of the second conductive layers 311*b* and 312*b* of each turn come into direct contact with the body 100. In the latter technique, as a result of the seed layer being formed along the inner surfaces of the opening, plating growth occurs from the inner surface and the bottom of the opening which may give rise to a void occurring and a defect occurring and provide a limit to increasing an aspect ratio of the opening (AR, substantially similar to the aspect ratio of a turn of the coil since the turn of the coil is formed in the opening). In the present embodiment, since the first conductive layers 311*a* and 312*a* (i.e., the seed layers of the second conductive layers 311*b* and 312*b*) are only disposed on a lower side of the second conductive layers 311*b* and 312*b*, the above-described problem may be solved. Therefore, in the present embodiment, the aspect ratio AR of each turn of the coil patterns 311 and 312 may be higher.

A via 320 may include at least one conductive layer. For example, when the via 320 is formed by electroplating, the via 320 may include a seed layer formed on an inner wall of the via hole penetrating through the insulating substrate 200 and an electroplating layer filling the via hole on which the seed layer is formed. The seed layer of the via 320 is formed together with the first conductive layers 311*a* and 312*a* in the same process to be integrally formed, or the seed layer of the via 320 is formed in a different process from that of the first conductive layers 311*a* and 312*a*, such that a boundary therebetween may be formed.

When a line width of each turn of the coil patterns 311 and 312 is too small and/or the thickness of each turn is too large, a coupling force between the body 100 and the coil patterns 311 and 312 may be a problem. As a non-limiting example, an aspect ratio AR of each turn of the coil patterns 311 and 312 may be 3:1 to 9:1.

Each of the coil patterns 311 and 312 and the via 320 may be formed of a conductive material such as copper (Cu), aluminum (Al), silver (Ag), tin (Sn), gold (Au), nickel (Ni), lead (Pb), titanium (Ti), chromium (Cr), molybdenum (Mo) or alloys thereof, but a material thereof is not limited thereto. As a non-limiting example, when the first conductive layers 311*a* and 312*a* are formed by sputtering and the second conductive layers 311*b* and 312*b* are formed by electroplating, the first conductive layers 311*a* and 312*a* may include at least one of molybdenum(Mo), chromium (Cr), and titanium (Ti), and the second conductive layers 311*b* and 312*b* may include copper (Cu). As another non-limiting example, when the first conductive layers 311*a* and 312*a* are formed by electroless plating while the second conductive layers 311*b* and 312*b* are formed by electroplating, each of the first conductive layers 311*a* and 312*a* and the second conductive layers 311*b* and 312*b* may include copper(Cu). In this case, density of copper (Cu) in the first conductive layers 311*a* and 312*a* may be lower than density of copper (Cu) in the second conductive layers 311*b* and 312*b*. As another non-limiting example, the first conductive layers 311*a* and 312*a* may be formed of a plurality of layers by arbitrarily combining a sputtering method and an electroless plating method.

External electrodes 400 and 500 are disposed on the surface of the body 100 and are connected to the coil portion 300 exposed to the surface of the body 100. In the present embodiment, one end portion of the first coil pattern 311 is exposed to the first surface 101 of the body 100, and one end portion of the second coil pattern 312 is exposed to the second surface 102 of the body 100. Therefore, the first external electrode 400 is disposed on the first surface 101 and is connected to be in contact with the end portion of the first coil pattern 311 exposed to the first surface 101 of the body 100, and the second external electrode 500 is disposed on the second surface 102 and is connected to be in contact with the end portion of the second coil pattern 312 exposed to the second surface 102 of the body 100.

The external electrodes 400 and 500 may each be formed as a single layer or a plurality of layers. For example, the first external electrode 400 may be comprised of a first layer including copper (Cu), a second layer disposed on the first layer and including nickel (Ni), and a third layer disposed on the second layer and including tin (Sn). Here, the first layer may include a seed layer formed by a vapor deposition method such as electroless plating or sputtering. Each of the second and third layers may be formed by electroplating, but is not limited thereto. As another example, the first external electrode 400 may include a resin electrode including conductive powder and a resin, and a plating layer plated and formed on the resin electrode. The resin electrode may be formed by screen printing or applying a conductive paste containing conductive powder and a resin and then curing the conductive paste.

The external electrodes 400 and 500 may include a conductive material such as copper (Cu), aluminum (Al), silver (Ag), tin (Sn), gold (Au), nickel (Ni), lead (Pb), titanium (Ti), or alloys thereof, but a material thereof is not limited thereto.

The external electrodes 400 and 500 may cover the first and second surfaces 101 and 102 of the body 100, respectively, and may both extend to the sixth surface 106 of the body. That is, the first external electrode 400 may cover the first surface 101 of the body 100 and extend to the sixth surface 106 of the body 100, and the second external electrode 500 may cover the second surface 102 of the body 100 and extend to the sixth surface 106 of the body 100. Since the external electrodes 400 and 500 cover the first and second surfaces 101 and 102 of the body 100, coupling force between the external electrodes 400 and 500 and the body 100 may be improved.

Although not shown, in the present embodiment, an insulating film disposed between the coil portion 300 and the body 100 may be further included. The insulating film may include an insulating material such as parylene, but is not limited thereto, and any insulating material may be used. The insulating film may be formed by a method such as vapor deposition, but is not limited thereto, and may be formed by a method in which the insulating film is laminated on both surfaces of the insulating substrate 200. In a former case, the insulating film may be formed in a form of a conformal film along the surfaces of the insulating substrate and the coil portion. In a latter case, the insulating film may be formed in a form of filling a space between adjacent turns of the coil patterns 311 and 312. Meanwhile, as described above, a plating resist for forming the second conductive layers **311*b* and 312*b* may be formed on the insulating substrate 200, and the plating resist may be a permanent resist that is not removed. In this case, the insulating film may be a plating resist functioning as a permanent resist. Meanwhile, in the present disclosure, the insulating film is only an optional configuration when forming the insulating film, and it is possible to manufacture the coil component 1000** according to the present embodiment by changing a typical thin film power inductor manufacturing process to a minimum, thus advantageously maintaining manufacturing efficiency and lowering costs. That is, in the case of the typical power inductor, a coil portion and an insulating film may be formed on an insulating substrate to form a coil substrate, and then a magnetic composite sheet for forming a body is laminated on both surfaces of the coil substrate. In the case of forming the insulating film in the present embodiment, a remaining process except for only the process for forming the body may be the same as the manufacturing process of the thin film power inductor. Therefore, a high frequency inductor and a power inductor may be selectively manufactured using the same coil substrate formed up to the insulating film.

FIG. 6 is a view illustrating variations in inductance according to an operating frequency of the coil component according to a first embodiment of the present disclosure in comparison with the comparative example.

In the experimental example, the thickness T1 of the insulating substrate was 30 μm, and in the comparative example, the thickness of the insulating substrate was 60 μm. Table 1 shows inductance values of each of the experimental and comparative examples when the frequency is 100 MHz, 500 MHz, 1.0 GHz, and 2.4 GHz.

Meanwhile, in the experimental example and the comparative example, remaining conditions except for the thickness T1 of the insulating substrate 200, for example, the number of turns of the coil portion, the line width and the thickness of each turn, the space between each turn, and the length, width, and the thickness of the body were equal.

TABLE 1

| | Comparative Example Inductance (nH) | Experimental Example Inductance (nH) | Improvement Rate |
|---|---|---|---|
| 100 MHz | 10.54 | 11.21 | 6% |
| 500 MHz | 10.14 | 10.85 | 7% |
| 1.0 GHz | 10.11 | 10.95 | 8% |
| 2.4 GHz | 11.10 | 12.25 | 9% |

Referring to Table 1 and FIG. 6, it can be seen that the inductance of the experimental example is higher than the inductance of the comparative example in all frequency bands when comparing the experimental example and the comparative example. Meanwhile, the difference in inductance between the comparative example and the experimental example increases gradually as an operating frequency increases, it can be seen that an improvement rate is closer to 10% at an operating frequency of 1 GHz or more. Referring to Table 1 and FIG. 6, the coil component 1000 of the present embodiment may be utilized as a high frequency inductor used in a high frequency band of (100 MHz or more), and particularly in a frequency band of 1 GHz or more.

Second Embodiment and Modified Example

Figure 7:
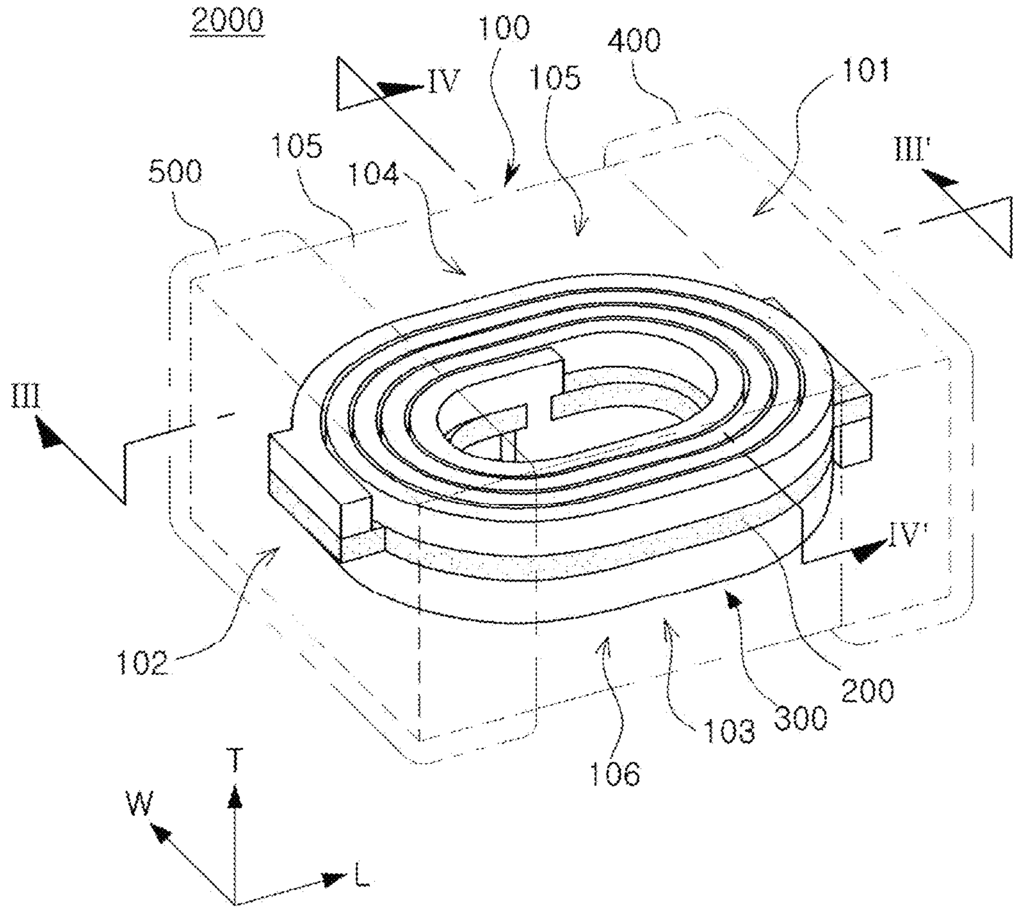
FIG. 7 is a schematic view illustrating a coil component according to a second embodiment of the present disclosure.
Figure 8:
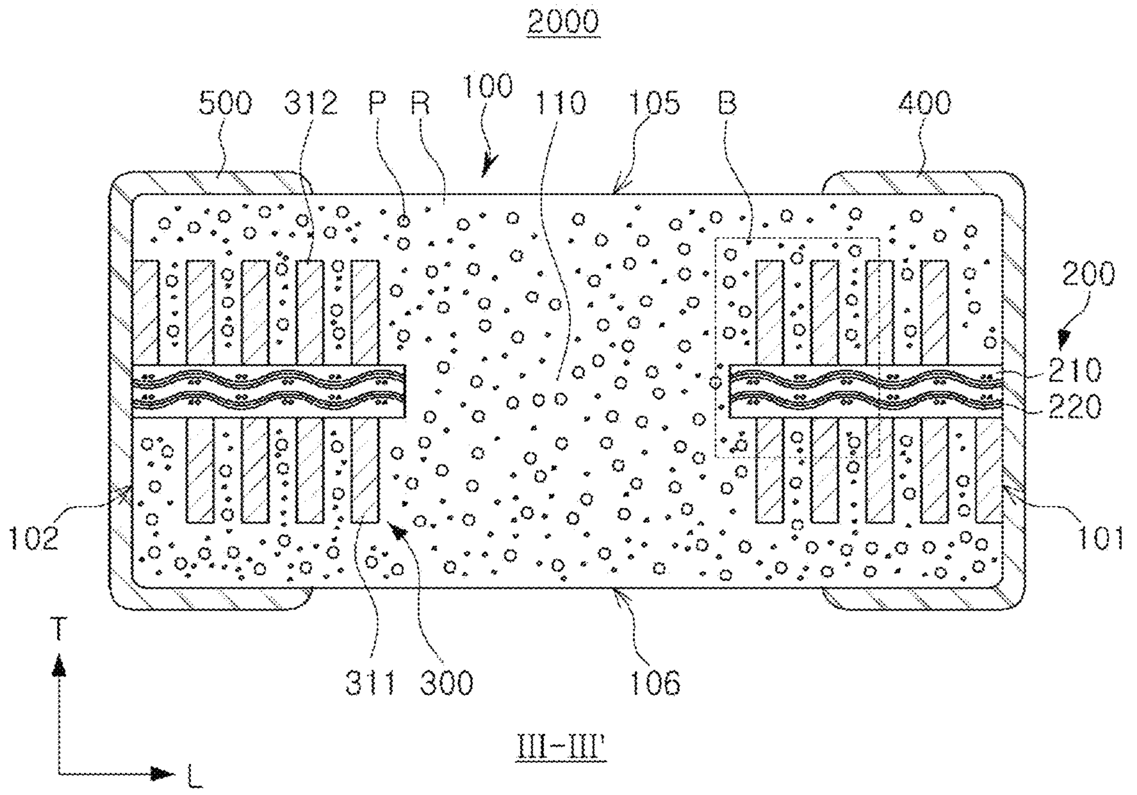
FIG. 8 is a cross-sectional view taken along line of FIG. 7.
Figure 9:
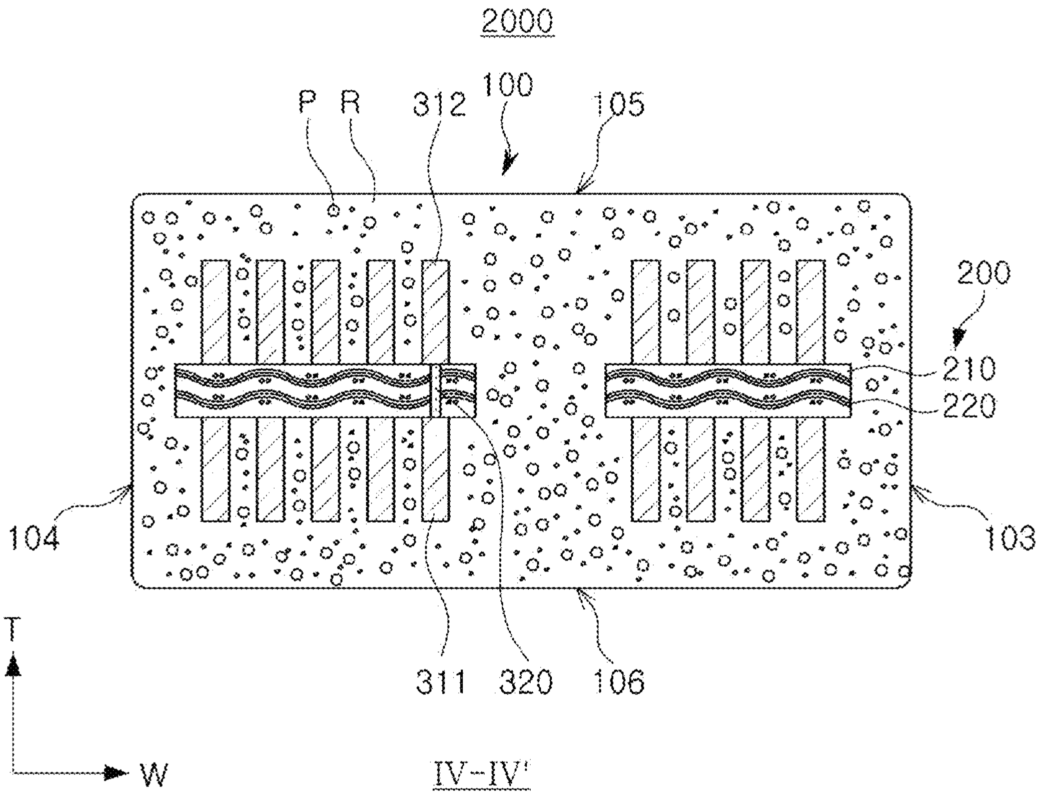
FIG. 9 is a cross-sectional view taken along line IV-IV' of FIG. 7.
Figure 10:
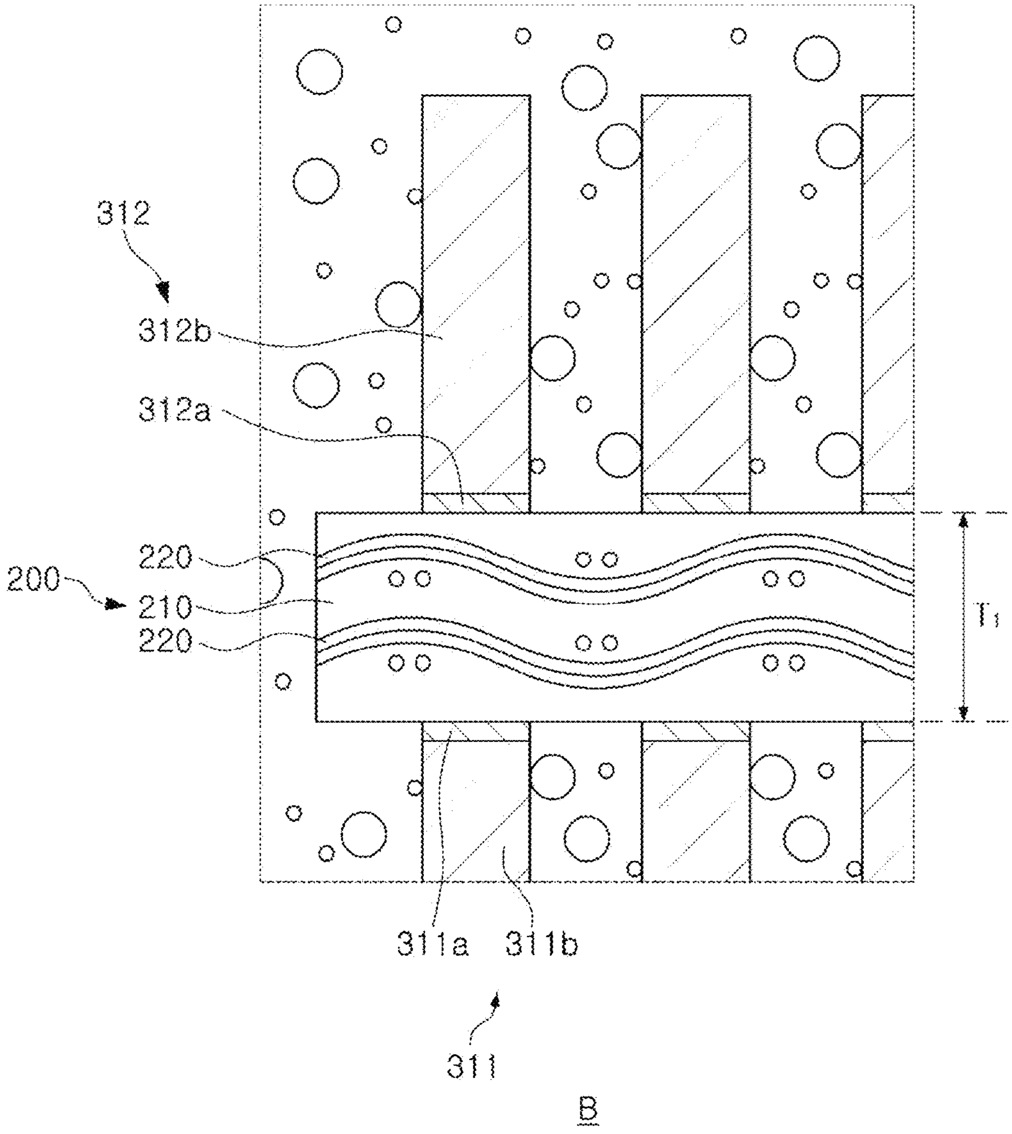
FIG. 10 is an enlarged view of portion B of FIG. 8.
Figure 11:
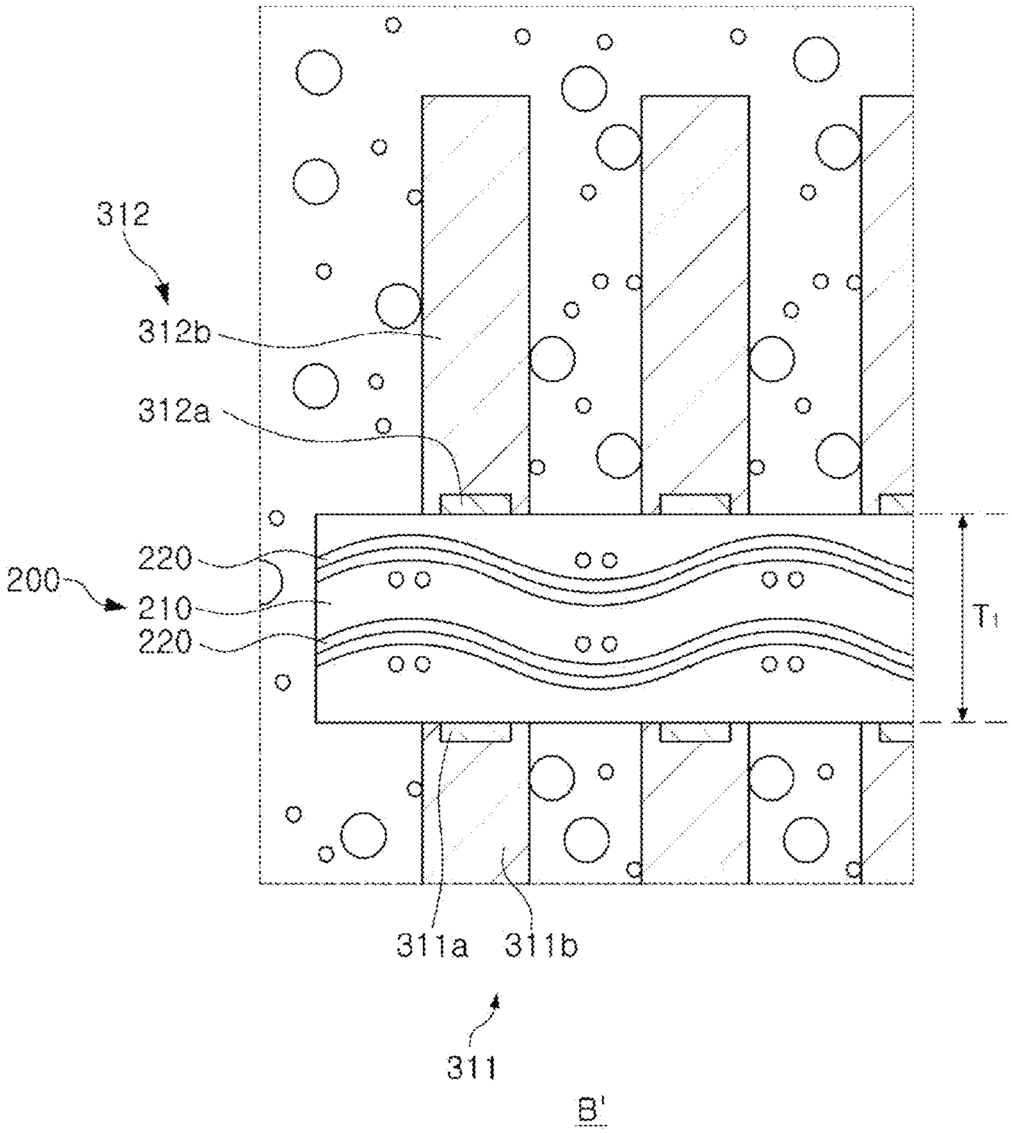
FIG. 11 is an enlarged view of a portion B of a modified example coil component.

FIG. 7 is a schematic view illustrating a coil component according to a second embodiment of the present disclosure. FIG. 8 is a cross-sectional view taken along line of FIG. 7. FIG. 9 is a cross-sectional view taken along line IV-IV' of FIG. 7. FIG. 10 is an enlarged view of portion B of FIG. 8. FIG. 11 is an enlarged view of a modified example of B of FIG. 8.

Comparing FIGS. 1 to 6 and FIGS. 7 to 11, in a coil component 2000 according to the present embodiment, a body 100 is different from the coil component 1000 according to a first embodiment of the present disclosure. Therefore, in the present embodiment, only the body 100, different from that of the first embodiment of the present disclosure, will be described. In other configurations of the present embodiment, description of the first embodiment may be applied as it is to the modified example of the first embodiment of the present disclosure. Referring to FIGS. 7 to 11, the body 100 applied to the coil component 2000 according to the present embodiment may include a cured product R of a polymer resin, and a nonmagnetic material P dispersed in the cured product R of the polymer resin.

For example, in the present embodiment, the body 100 may be formed by laminating one or more composite sheets including a nonmagnetic thermosetting polymer resin and nonmagnetic powder P dispersed in the thermosetting polymer resin on both surfaces of the insulating substrate 200 on which the coil portion 300 is formed, and then thermosetting the composite sheets. The nonmagnetic powder P is dispersed and disposed in the cured product R of the polymer resin in order to control at least one of magnetic, electrical, mechanical and thermal characteristics of the coil component 2000 according to the present embodiment, and the content of nonmagnetic powder Pin the body 100 may be adjusted in order to control at least one of the characteristics described above.

The nonmagnetic powder P may include at least one of an organic filler and an inorganic filler.

The organic filler may include, for example, at least one of Acrylonitrile-Butadiene-Styrene (ABS), Cellulose acetate, Nylon, Polymethyl methacrylate (PMMA), Polybenzimidazole, Polycarbonate, Polyether sulfone, Polyetherether ketone (PEEK), Polyetherimide (PEI), Polyethylene, Polylactic acid, Polyoxymethylene, Polyphenylene oxide, Polyphenylene sulfide, Polypropylene, Polystyrene, Polyvinyl chloride, Ethylene vinyl acetate, Polyvinyl alcohol, Polyethylene oxide, Epoxy, and Polyimide.

The inorganic filler may include at least one or more selected from a group consisting of silica ($SiO_2$), alumina ($Al_2O_3$), silicon carbide (SiC), titanium oxide ($TiO_2$), barium sulfate ($BaSO_4$), aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$). Meanwhile, a range of the inorganic filler of the present embodiment is not limited to the above-described example, as long as it is a ceramic material which has a value whose specific permeability is close to 1, it is included in the inorganic filler of the present embodiment. The nonmagnetic powder P may have an average diameter of about 0.1 μm to 30 μm, but is not limited thereto.

The body 100 may include two or more kinds of nonmagnetic powder P dispersed in the cured product R of the polymer resin. Here, the nonmagnetic powder P has different types, which means that the types of nonmagnetic powder P dispersed in the cured product R of the polymer resin are distinguished from each other by any one of a diameter, composition, crystallinity, and a shape. As an example, the body 100 may include two or more nonmagnetic powder P types having different diameters. The diameter of the nonmagnetic powder P may mean a particle size distribution of the powder according to $D_{50}$ or $D_{90}$.

A volume of the nonmagnetic powder P with respect to a total volume of the cured product R of the polymer resin may be 50 vol % or more. In the present embodiment, since the cure product R of the polymer resin is formed by thermosetting a thermosetting polymer resin, a volume ratio (vol %) of the nonmagnetic powder P dispersed in the cured product R of the polymer resin may be increased. On the contrary, as an example, when the body is a cured product of a photocurable polymer resin, light is scattered by the nonmagnetic powder P during photocuring, and thus photocurability is lowered. Therefore, there may be a limit of increasing the volume ratio of the nonmagnetic powder P in such examples. In the present embodiment, since the body 100 is formed using a thermosetting resin, the above-described problem may be solved. Therefore, in the present embodiment, in adjusting the content of nonmagnetic powder P in a composite sheet, it is not necessary to consider a problem that may occur due to the content of the nonmagnetic powder P in a curing process of the composite sheet. As a result, in the present embodiment, a degree of freedom in a manufacturing process and design may be increased to easily control magnetic, electrical, mechanical, and thermal characteristics of the coil component 2000 according to the present embodiment. As an example, by containing 50 vol % or more of silica($SiO_2$) having a relatively low coefficient of thermal expansion in the body 100, a difference of the coefficient of thermal expansion between the coil component 2000 of the present embodiment and a mounting substrate or a semiconductor component mounted together on the mounting substrate may be significantly reduced. Thus, a defect of an electronic component package, for example, warpage of the package or the occurrence of voids in the package, due to a difference in coefficients of thermal expansion between the coil component 2000 according to the present embodiment packaged together in the electronic package and other electronic components may be prevented. In addition, it is possible to reduce the problem of connection reliability between the component and the mounting substrate (for example, crack in solder) caused by the difference in the coefficients of thermal expansion between the component and the mounting substrate.

Meanwhile, an inorganic filler included in the insulating substrate 200 described in the first embodiment of the present disclosure and an inorganic filler included in the body 100 of the present embodiment may be the same material, but is not limited thereto. As a non-limiting example, by the difference in the coefficient of thermal expansion between the body 100 and the insulating substrate 200, to prevent the body 100 and the insulating substrate 200 from being separated from each other, the inorganic filler included in the insulating substrate 200 and the inorganic filler included in the body 100 may be made of the same material as a main ingredient and the different materials as an accessory ingredient.

Referring to FIGS. 10 and 11, the nonmagnetic powder P is in contact with each of the coil patterns 311 and 312. That is, the coil patterns 311 and 312 may be in direct contact with the body 100. In the present embodiment, unlike the typical thin film power inductor, since the nonmagnetic powder P of the body 100 described above has non-conductive properties, even if a separate insulating film is not formed between the nonmagnetic powder P and the coil patterns 311 and 312, it does not affect the component properties. However, as described above, an insulating film can optionally be disposed between the coil patterns 311 and 312 and the body

100 for manufacturing advantages, such that the nonmagnetic powder P may not contact the coil patterns 311 and 312.

Meanwhile, as illustrated in FIGS. 10 and 11, each of the coil patterns 311 and 312 includes first conductive layers 311*a* and 312*a* formed in contact with the insulating substrate 200 and second conductive layers 311*b* and 312*b* disposed on the first conductive layers 311*a* and 312*a*. FIGS. 10 and 11 are views corresponding to FIGS. 4 and 5 of the first embodiment of the present disclosure, respectively, and thus, since the descriptions of FIGS. 4 and 5 of the first embodiment of the present disclosure may be applied as they are, the detailed descriptions of FIGS. 10 and 11 will be omitted.

Third Embodiment and Modified Example

Figure 12:
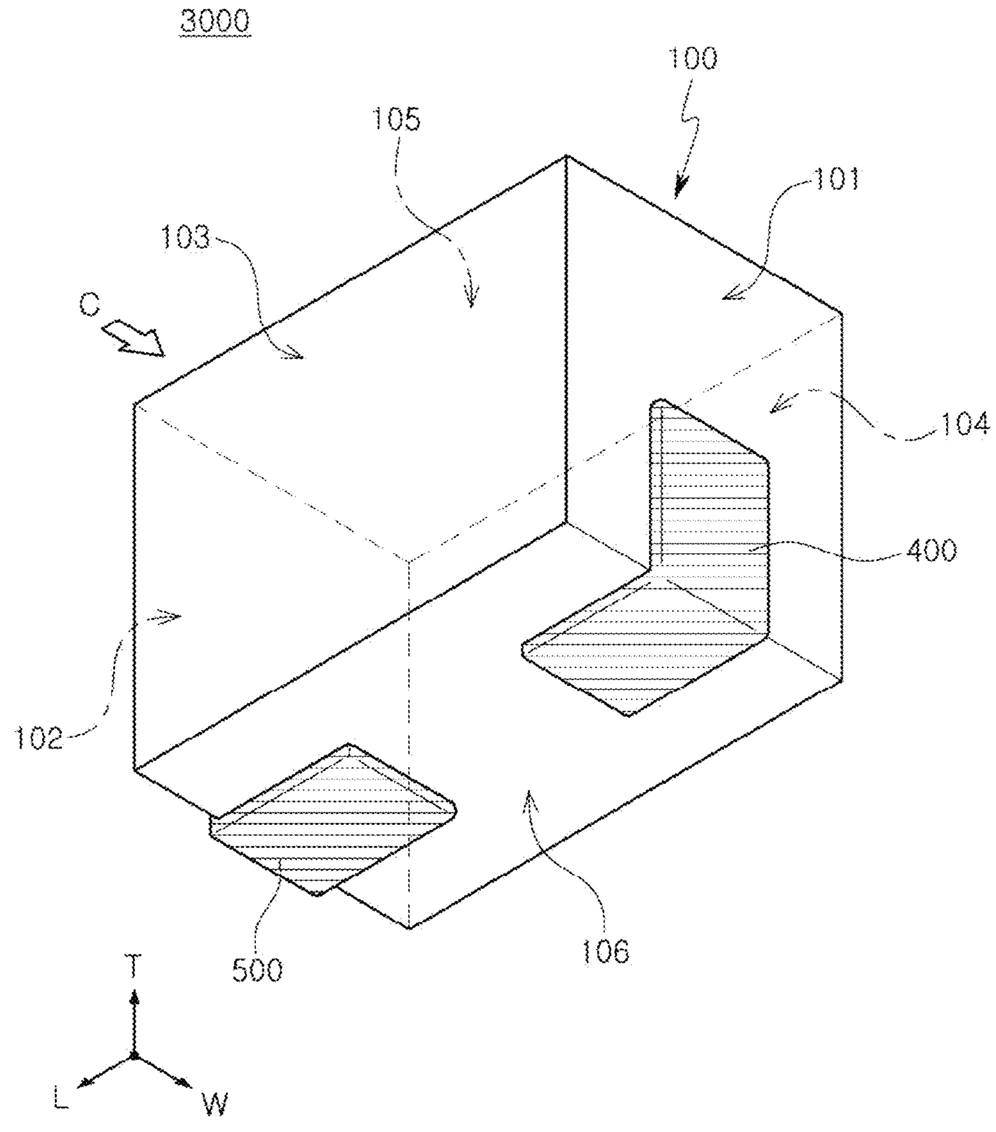
FIGS. 12 and 13 are schematic views illustrating a coil component according to a third embodiment of the present disclosure viewed from a lower side.
Figure 13:
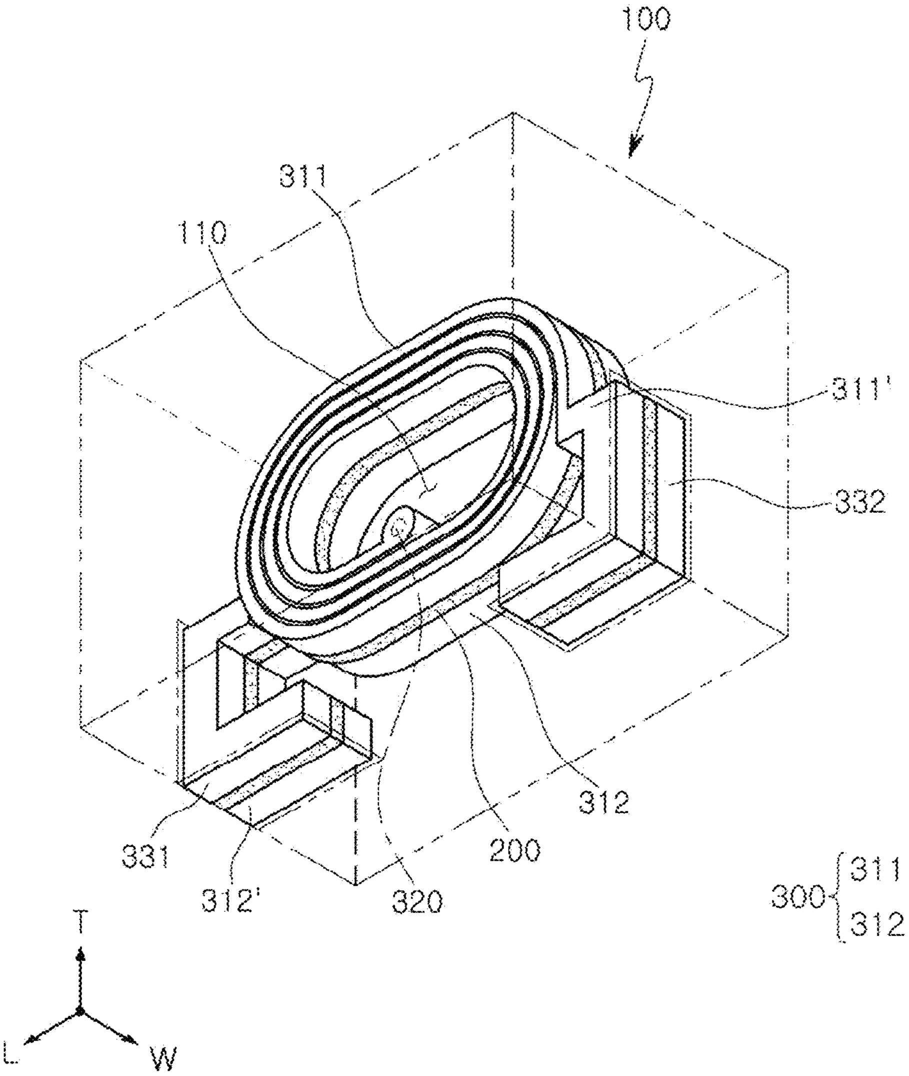
Figure 14:
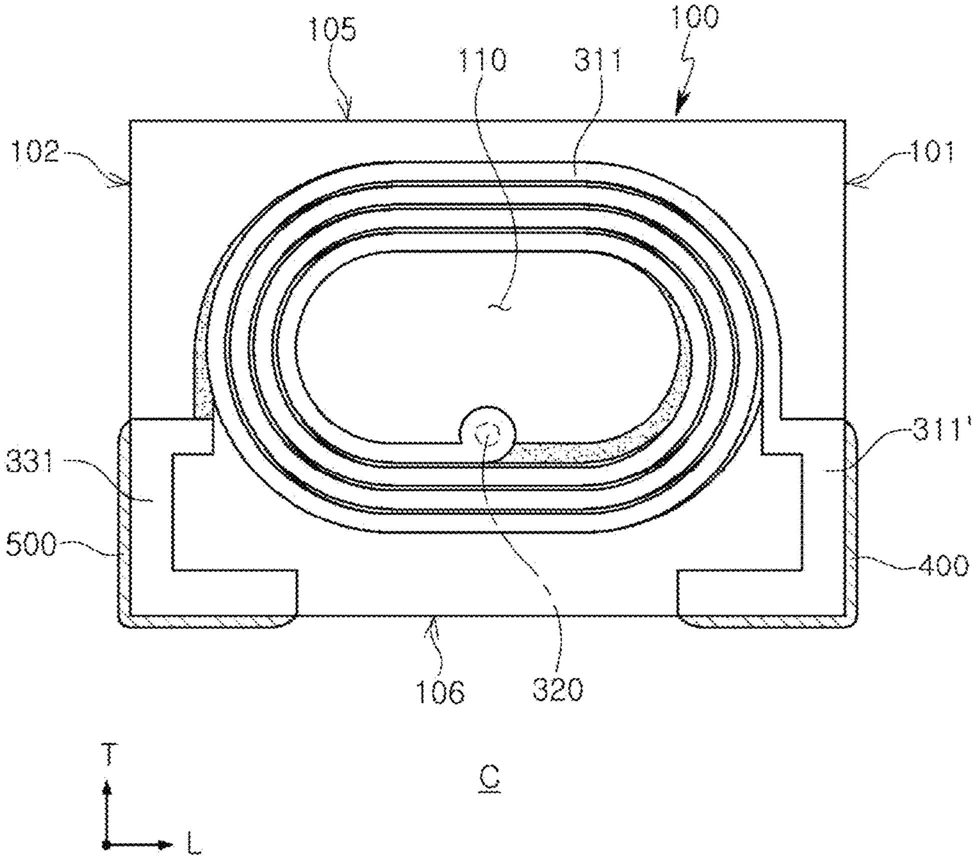
FIG. 14 is a schematic view illustrating the coil component according to the third embodiment viewed in direction C of FIG. 12.
Figure 15:
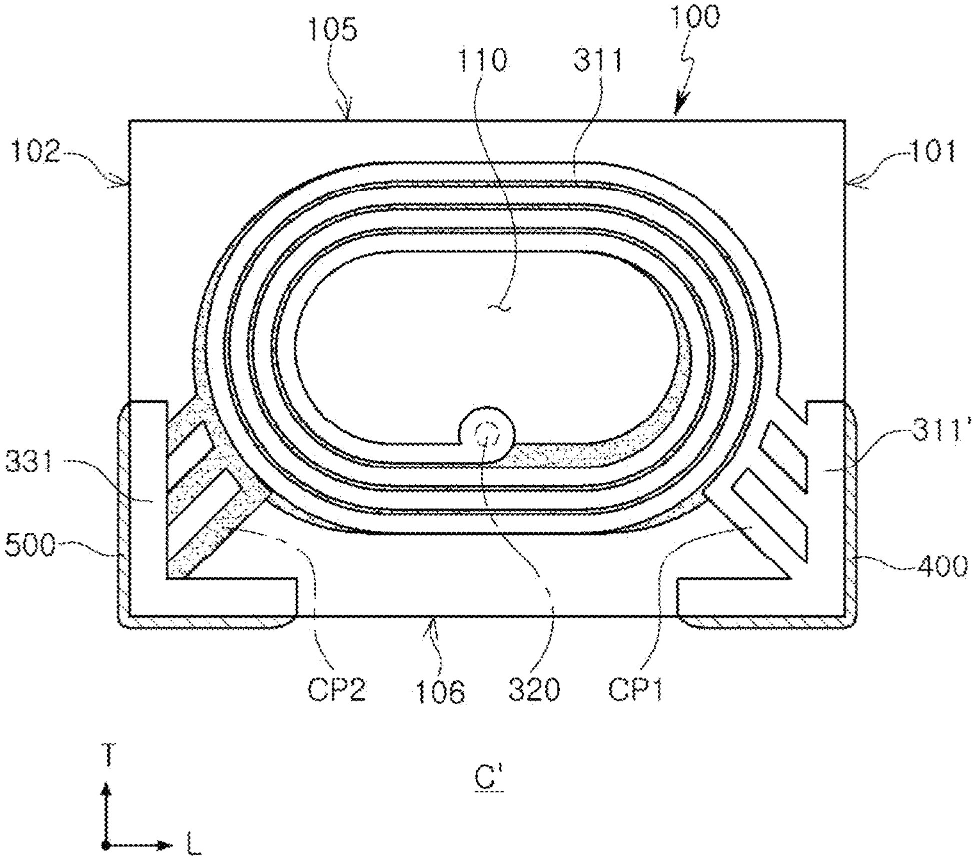
FIG. 15 is a schematic view illustrating a modified example of the third embodiment of the present disclosure viewed in the direction C of FIG. 12.

FIGS. 12 and 13 are schematic views illustrating a coil component according to a third embodiment of the present disclosure viewed from a lower side. FIG. 14 is a schematic view illustrating what is viewed from a direction C of FIG. 12. FIG. 15 is a view illustrating a modified example of a third embodiment of the present disclosure, and provides a view corresponding to what is viewed from the direction of C of FIG. 12.

Comparing FIGS. 1 to 6 and FIGS. 7 to 11, a coil component 3000 of FIGS. 12 to 15 according to the present embodiment has a different dispositional form of the coil portion 300 in the body 100, as compared with the coil components 1000 and 2000 according to the first and second embodiments of the present disclosure. Therefore, in the present embodiment, only the dispositional form of the coil portion 300, different from that of the first and second embodiments of the present disclosure will be described. In the remaining configuration of the present embodiment, description of the first and second embodiments may be applied as it is to the modified example of the present disclosure.

Referring to FIGS. 12 to 14, a coil portion 300 applied to a coil component 3000 according to the present embodiment is disposed to be perpendicular to one surface 106 of the body 100.

The coil portion 300 is disposed to be perpendicular to the sixth surface 106 of the body 100, which means, as shown in FIGS. 13 and 14, that surfaces of the coil patterns 311 and 312 in contact with the insulating substrate 200 are formed to be perpendicular to the sixth surface 106 of the body 100 or to be close to be perpendicular to the sixth surface 106 of the body 100. For example, a surface of each turn of the first coil pattern 311 in contact with the insulating substrate 200 and the sixth surface 106 of the body 100 may form an angle of 80° to 100°.

As electronic devices gain higher performance, more electronic components are mounted on mounting boards such as printed circuit boards, or the like disposed in the electronic devices. To this end, it is desirable to maintain or improve the performance of the electronic component while reducing any one of a length and a width of the body that determines a mounting area of each electronic component. In the present embodiment, by disposing the coil portion 300 to be perpendicular to the sixth surface 106 of the body 100, an area of the sixth surface 106 of the body 100 (which may correspond to a mounting surface of the coil component 3000 according to the present embodiment) may be reduced. In addition, by disposing the coil portion 300 to be perpendicular to the sixth surface 106 of the body 100, changes can be made to the number of turns, a line width, and thickness of each turn of the coil patterns 311 and 312 without changing a mounting area thereof by providing different characteristics to the coil component. In addition, by disposing the coil portion 300 to be perpendicular to the sixth surface 106 of the body 100, a direction of a magnetic field formed by the coil portion 300 is parallel to the sixth surface 106 of the body 100. Thus, an induction current in the mounting board such as a printed circuit board, or the like, may be reduced due to the magnetic field.

In the present embodiment, each of the end portions 311' and 312' of the coil portion 300 may be exposed to two surfaces connected to each other among the first to sixth surfaces 101, 102, 103, 104, 105, and 106. That is, as illustrated in FIG. 13, one end portion 311' of the first coil pattern 311 may be exposed to the first surface 101 of the body 100 and the sixth surface 106 of the body 100, and one end portion 312' of the second coil pattern 312 may be exposed to the second surface 102 of the body 100 and the sixth surface 106 of the body 100. One end portion 311' of the first coil pattern 311 may be continuously exposed to the first surface 101 and the sixth surface 106 of the body 100, and one end portion 312' of the second coil pattern 312 may be continuously exposed to the second surface 102 and the sixth surface 106 of the body 100. In the present embodiment, the external electrodes 400 and 500 are formed on the first, second and the sixth surfaces 101, 102, and 106 of the body 100 so as to cover both end portions 311' and 312' of the coil portion, exposed to the surfaces of the body 100. As the components are miniaturized, exposed areas of the both end portions 311' and 312' of the coil portion 300 may be reduced, and as a result, a coupling force between the coil portion 300 and the external electrodes 400 and 500 may be reduced.

In the present embodiment, the exposed area of both end portions 311' and 312' of the coil portion 300 exposed to the surface of the body 100 may be increased to improve the coupling force between the coil portion 300 and the external electrodes 400 and 500. In the present embodiment, the coil portion 300 may further include auxiliary patterns 331 and 332 corresponding to both end portions 311' and 312' of the coil patterns 311 and 312, respectively. Specifically, the coil portion 300 may include a first auxiliary pattern 331 disposed on one surface (a front surface of the insulating substrate 200 based on the direction of FIG. 13) of the insulating substrate 200 on which the first coil pattern 311 is disposed and formed to be spaced apart from the first coil pattern 311 and to have a shape and position that correspond to one end portion 312' of the second coil pattern 312. In addition, the coil portion 300 may include a second auxiliary pattern 332 disposed on the other surface (rear surface of the insulating substrate 200 based on the direction of FIG. 13) of the insulating substrate 200 on which the second coil pattern 312 is disposed and formed to be spaced apart from the second coil pattern 312 and to have a shape and position that correspond to the one end portion 311' of the first coil pattern 311. The first auxiliary pattern 331 may be exposed to the second and sixth surfaces 102 and 106 of the body 100, similarly to the end portion 312' of the second coil pattern 312, and the second auxiliary pattern 332 may be exposed to the first and sixth surfaces 101 and 106 of the body, similarly to the end portion 311' of the first coil pattern 311. The auxiliary patterns 331 and 332 may be in contact with the external electrodes 500 and 400, similarly to both end portions 312' and 311' of the coil portion. The coupling force between the coil portion 300 and the external electrodes 400 and 500 may be improved by increasing the area of the coil portion 300 in contact with the external electrodes 400 and 500. In addition, when the external electrodes 400 and 500 are formed by electroplating using only the end portions 311' and 312' of the coil portion 300, the external electrodes 400 and 500 may be asymmetrically formed, resulting in appearance defects. The above-described problems may be solved due to the auxiliary patterns 331 and 332. Meanwhile, although not shown, one end portion 311' of the first coil pattern 311 and the second auxiliary pattern 332 and one end portion 312' of the second coil pattern 312 and the first auxiliary pattern 331 may be physically and electrically connected to each other by a connection via penetrating through the insulating substrate 200, respectively.

FIG. 15 is a view illustrating a modified example of a third embodiment of the present disclosure, in a view corresponding to what is viewed from the direction C of FIG. 12. Referring to FIG. 15, a coil portion 300 applied to the modified example of the present embodiment may further include a plurality of connection patterns CP1 and CP2 for connecting the coil patterns 311 and 312 and the end portions 311' and 312' of the coil patterns 311 and 312. Specifically, the coil portion 300 may further include a plurality of first connection patterns CP1 disposed on one surface of the insulating substrate 200 to connect the first coil pattern 311 and the end portion 311' of the first coil pattern 311 and a plurality of second connection patterns CP2 disposed on the other surface of the insulating substrate 200 to connect the second coil pattern 312 and the end portion 312' of the second coil pattern 312.

Each of the first and second coil patterns CP1 and CP2 may be formed as a plurality thereof to be spaced apart from each other. In the case of a structure in which an end portion of the coil pattern is connected in a single pattern, a coupling force between the coil pattern and the body may be weakened due to coupling between different materials. In the present modified example, connection patterns CP1 and CP2 for connecting the coil patterns 311 and 312 and end portions 311' and 312' of the coil patterns 311 and 312 may be formed as a plurality thereof to be spaced apart from each other, respectively, such that the body 100 may be extended and disposed in a space between separate parts of the connection patterns CP1 and CP2 adjacent to each other. As a result, the coupling force between the body 100 and the coil portion 300 may be improved. That is, the plurality of connection patterns CP1 and CP2 spaced from each other may function as anchors. Meanwhile, in this case, as shown in FIG. 15, a region in which the connection patterns CP1 and CP2 are disposed in the insulating substrate 200 may have a shape corresponding to the shape of the plurality of connection patterns CP1 and CP2 spaced apart from each other. That is, the body 100 may be formed to penetrate through a space between the plurality of connection patterns CP1 and CP2 and through the insulating substrate 200.

As set forth above, according to the present disclosure, a high frequency coil component may be provided with a low-profile.

In addition, according to the present disclosure, component characteristics may be improved in a high frequency band.

While example embodiments have been shown and described above, it will be apparent to those skilled in the art that modifications and variations could be made without departing from the scope of the present disclosure as defined by the appended claims.

What is claimed is:

1. A coil component comprising:

a nonmagnetic body including a cured polymer resin and a nonmagnetic material dispersed within the cured polymer resin;

an insulating substrate, having a through-hole extending therethrough to define an inner side surface of the insulating substrate, embedded in the nonmagnetic body and having a thickness of 30 μm or less;

a coil portion including first and second coil patterns respectively disposed on first and second opposing surfaces of the insulating substrate; and first and second external electrodes disposed on a surface of the nonmagnetic body to be respectively connected to the first and second coil patterns, wherein the nonmagnetic body is disposed directly on the inner side surface of the insulating substrate.

2. The coil component of claim 1, wherein a volume of the nonmagnetic material with respect to a total volume of the cured polymer resin is 50 vol % or more.

3. The coil component of claim 1, wherein the nonmagnetic material is in contact with each of the first and second coil patterns.

4. The coil component of claim 1, wherein the nonmagnetic material comprises at least one of an organic filler or an inorganic filler.

5. The coil component of claim 4, wherein the organic filler comprises at least one of Acrylonitrile-Butadiene-Styrene (ABS), Cellulose acetate, Nylon, Polymethyl methacrylate (PMMA), Polymethyl methacrylate, Polybenzimidazole, Polycarbonate, Polyether sulfone, Polyetherether ketone (PEEK), Polyetherimide (PEI), Polyethylene, Polylactic acid, Polyoxymethylene, Polyphenylene oxide, Polyphenylene sulfide, Polypropylene, Polystyrene, Polyvinyl chloride, Ethylene vinyl acetate, Polyvinyl alcohol, Polyethylene oxide, Epoxy, or Polyimide.

6. The coil component of claim 4, wherein the inorganic filler comprises at least one of silica ($SiO_2$), alumina ($AL_2O_3$), or titanium oxide ($TiO_2$).

7. The coil component of claim 1, wherein the insulating substrate has a thickness of 10 μm or more.

8. The coil component of claim 1, wherein each of the first and second coil patterns comprises a first conductive layer in contact with the insulating substrate and a second conductive layer disposed on the first conductive layer.

9. The coil component of claim 8, wherein the first conductive layer comprises at least one of copper (Cu), titanium (Ti), chromium (Cr), or molybdenum (Mo), and the second conductive layer comprises copper (Cu).

10. The coil component of claim 8, wherein at least a portion of a side surface of the first conductive layer is free of the second conductive layer.

11. The coil component of claim 8, wherein the second conductive layer covers side surfaces of the first conductive layer and is in contact with the insulating substrate.

12. The coil component of claim 8, wherein a side surface of the second conductive layer is in contact with the nonmagnetic body.

13. The coil component of claim 1, wherein the nonmagnetic body has a thickness of 0.65 mm or less.

14. The coil component of claim 1, wherein the nonmagnetic body has one end surface opposite another end surface thereof, and one surface connecting the one end surface and the other end surface to each other, one end portion of the first coil pattern is exposed to the one end surface of the nonmagnetic body, and one end portion of the second coil pattern is exposed to the other end surface of the nonmagnetic body, and the first and second external electrodes are respectively disposed on the one end surface and the other end surface of the nonmagnetic body, and each extend onto the one surface of the nonmagnetic body.

15. The coil component of claim 14, wherein the first and second external electrodes respectively cover the one end surface and the other end surface of the nonmagnetic body.

16. A coil component comprising:

an insulating substrate having a thickness of 30 μm or less and a through-hole extending therethrough to define an inner side surface of the insulating substrate;

a coil portion including a planar spiral coil pattern having a plurality turns disposed on at least one surface of the insulating substrate; and a body including nonmagnetic material and a polymer resin, the body having the insulating substrate and the coil portion embedded therein and having a thickness of 0.65 mm or less, wherein the body is in contact with the coil planar spiral pattern and fills spaces between adjacent turns of the plurality of turns of the planar spiral coil pattern, and wherein the body is disposed directly on the inner side surface of the insulating substrate.

17. The coil component of claim 16, wherein the body in contact with the coil planar spiral pattern is nonmagnetic.

18. The coil component of claim 17, wherein the body in contact with the coil planar spiral pattern has a relative magnetic permeability of 1.5 or less.

19. The coil component of claim 16, wherein the body in contact with the coil planar spiral pattern includes a paramagnetic material or a diamagnetic material.

20. A coil component comprising:

a support substrate having a through-hole extending therethrough to define an inner side surface of the support substrate;

a coil portion including a spiral shaped coil pattern disposed on at least one surface of the support member to extend around the through-hole; and a nonmagnetic body having the support substrate and spiral shaped coil pattern embedded therein and in contact therewith, extending through the through-hole of the support substrate, and extending between adjacent windings of the spiral shaped coil pattern, wherein the nonmagnetic body includes a cured polymer resin, and a nonmagnetic material dispersed in the cured polymer resin, and wherein the nonmagnetic body is disposed directly on the inner side surface of the support substrate.

21. The coil component of claim 20, wherein the nonmagnetic body has a relative magnetic permeability of 1.5 or less.

22. The coil component of claim 20, wherein the support substrate has a thickness of 30 μm or less.

23. The coil component of claim 20, further comprising external electrodes disposed in contact with outer surfaces of the nonmagnetic body and connected to opposite ends of the coil portion, wherein the nonmagnetic body directly contacts the external electrodes and the spiral shaped coil pattern of the coil portion.

24. The coil component of claim 20, wherein the coil portion includes:

first and second spiral shaped coil patterns respectively disposed first and second opposing surfaces of the support member to extend around the through-hole;

an end portion of the first spiral shaped coil pattern disposed on the first surface of the support member and contacting a first external electrode; and an end portion of the second spiral shaped coil pattern disposed on the second surface of the support member and contacting a second external electrode.

25. The coil component of claim 20, wherein a volume of the nonmagnetic material with respect to a total volume of the cured polymer resin is 50 vol % or more.

* * * * *